United States Patent [19]

Albrecht et al.

[11] Patent Number: 4,920,292
[45] Date of Patent: Apr. 24, 1990

[54] MOTOR HAVING ROTOR CAPABLE OF BOTH STEPPED ROTARY AND AXIAL SHIFT MOTIONS

[75] Inventors: Klaus Albrecht, Königsfeld; Helmut Hans, St. Georgen; Johann von der Heide, Schramberg; Fritz Schmider, Hornberg, all of Fed. Rep. of Germany

[73] Assignee: Papst-Motoren GmbH & Co. KG, Black Forest, Fed. Rep. of Germany

[21] Appl. No.: 90,743

[22] Filed: Aug. 28, 1987

[30] Foreign Application Priority Data

Aug. 29, 1986 [DE] Fed. Rep. of Germany ....... 3629377

[51] Int. Cl.$^5$ .............................................. H02K 16/02
[52] U.S. Cl. ................................. 310/114; 310/49 R; 310/80; 318/625
[58] Field of Search .................. 310/112, 12, 113, 30, 310/80, 114, , 191, 209; 290/38 A; 318/48, 625; 74/424.8 B

[56] References Cited

U.S. PATENT DOCUMENTS

| | | | |
|---|---|---|---|
| 2,805,373 | 9/1957 | Bonnell | 318/625 |
| 2,805,375 | 9/1957 | Morgan | 318/48 |
| 2,860,266 | 11/1958 | Schrader | 310/112 |
| 3,407,680 | 10/1968 | Westmoreland | 74/424.8 B |
| 4,156,817 | 5/1979 | Preece et al. | 310/80 |
| 4,528,473 | 7/1985 | Tezuka | 310/156 |

FOREIGN PATENT DOCUMENTS

| | | | |
|---|---|---|---|
| 100448 | 2/1924 | Austria | 290/38 A |
| 607673 | 1/1935 | Fed. Rep. of Germany | 310/78 |

Primary Examiner—Patrick R. Salce
Assistant Examiner—D. L. Rebsch
Attorney, Agent, or Firm—Fitch, Even, Tabin & Flannery

[57] ABSTRACT

A step motor which, in addition to an exciter system for step-by-step movement, is provided with an axial exciter system. As a result of the direct or indirect influence of the magnetic field generated by the secondary exciter system on the rotor which is supported, so as to be able to move in an axial direction with respect to the stator, the rotor can be induced to move in a direction perpendicular to its step-by-step rotary motion, as well. Both exciter systems can be energized independently of one another, so that step-by-step rotary movement can be performed at any axial position of the rotor and the rotor can be made to move in an axial direction during its rotary movement as well as when it is at rest.

42 Claims, 6 Drawing Sheets

MOTOR HAVING ROTOR CAPABLE OF BOTH STEPPED ROTARY AND AXIAL SHIFT MOTIONS

The present invention relates to an electric motor provided with an exciter system imparting step-by-step rotary movement to the rotor.

Many versions of this type of motor are already known and have been described as "step motors". The construction of the stator, rotor and exciter system of a motor of this type is such that the motor can be made to rotate in defined steps, as current is provided to the individual coil windings in a predetermined sequence of pulses. The particular advantages of this type of motor are that this design provides a simple means of making the motor travel through a precise angle of rotation and that the rotor can be placed at predetermined positions in an extremely predictable way. This type of motor will be mainly employed in applications where step motion of repeated or varying extent has to be carried out. A further advantage is that this motor design can be directly driven in digitally controlled appliances.

However, in many applications, the driven side of the step motor will be required to perform single or multistep motion in a secondary direction of travel, perpendicular to its motion in the primary direction. One example of this type of application is the color ribbon drive in a typewriter or similar machine, in which the color ribbon must be transported step-by-step in a longitudinal direction but must also be moved to at least two different positions in a direction at right angles to the primary direction of travel. In order to achieve this pattern of movement, a first step motor was hitherto used to power movement in one direction and a second motor was employed for movement in the other direction. Solenoids have also sometimes been used to power movement in the secondary direction.

The purpose of the present invention is to provide a motor of the type referred to at the outset, with which a driven component can be moved in two directions, perpendicular to one another.

The particular advantages of the present invention lie in the fact that both functions — namely, the movement of a driven part in two directions, perpendicular to one another — is brought about with one and the same component. In this way, with a motor according to the present invention, it will no longer be necessary to employ a further component of the type previously employed to power movement in a secondary direction. In addition, the installation of a motor according to the present invention in an appliance and/or coupling such a motor to a driven component will allow the user to achieve a considerable weight saving.

Furthermore, with one advantageous embodiment of the present invention it becomes possible to split rotor movement in the secondary direction into a number of steps, thus allowing the driven part to adopt a number of different positions in progressive stages. In addition, one of the distinguishing characteristics of this embodiment is that it achieves a particularly flat space envelope and a compact design, especially in the axial plane.

The further advantages of the present invention will be exemplified in the various embodiments which are described below in further detail with the help of the illustrations, where.

Figure 1:
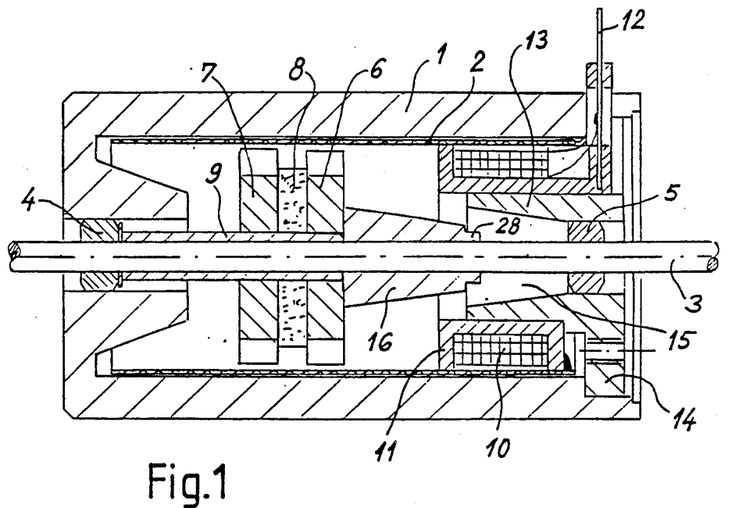
FIG. 1 shows a first embodiment of the present invention

FIG. 1 shows a cross section of an electric step motor in which an air-core type winding 2, whose configuration takes the form of a cylindrical envelope, is provided with coils (FIG. 3) which lie adjacent to one another in an axial direction, whereby the winding is arranged inside a housing 1 of ferromagnetic material. A shaft of nonmagnetic material is supported on two plain bearings 4, 5 which are mounted in the housing 1 so as to allow the shaft to rotate, and also move in an axial direction. A rotor, consisting of two ferromagnetic pole wheels 6, 7 an axially magnetized permanent magnet 8 arranged between the two pole wheels, is firmly fastened to the shaft 3 by means of bushing 9, in such a way as to prevent the rotor from either rotating or shifting in an axial direction. The bushing 9, which should preferably be made from nonmagnetic material so as to enhance magnetic screening, serves as a stop for the movement of the shaft 3 as it moves in an axial direction against the left hand bearing 4.

A ring coil 10 is arranged in a coil carrier 11 at the right hand end of the housing 1 and the current leads to this coil, as well as to the air-core type winding 2, are brought out from the motor housing 1 over a printed circuit board in the usual way. A cylindrical continuation of the motor flange 14, a flux conductor 13, which is also made of ferromagnetic material, extends into the internal space of the ring coil 10 and/or coil carrier 11. The flux conductor 13 is provided with a conical recess 15 whose larger opening is on the left hand side (as viewed in FIG. 1) and matches a conically shaped armature 16 fastened to the shaft.

Figure 2:
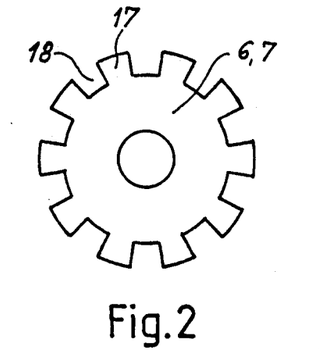
FIG. 2 shows a detail of the embodiment according to FIG. 1
Figure 3:
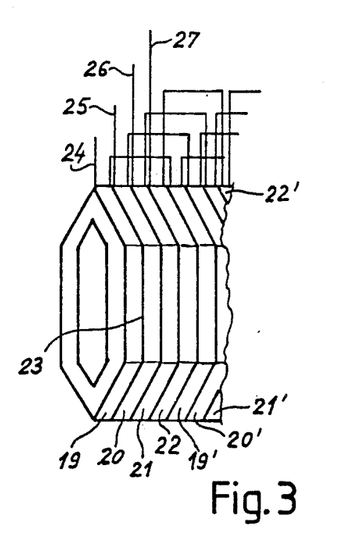
FIG. 3 shows a further detail of the embodiment according to FIG. 1.

The pole wheels 6, 7 of the rotor are identical and their configuration is shown in FIG. 2. Slots 18 are provided at the perimeter of the pole wheels, and the number of teeth 17 on the pole wheels will thus depend on the number of coil windings. It will be noted that at the perimeter of the pole wheels 6, 7, the teeth 17 and the slots 18 are of the same width. However, the position of the right hand pole wheel 6 is offset by half a tooth pitch with respect to the left hand pole wheel 7. FIG. 3 shows a developed view of a part of the air-core type winding 2, in which the windings 19, 20, 21 and 22; 19', 20', 21' and 22' are wound hexagonally in a horizontal plane, whereby one long leg 23 of the hexagon is arranged in an axial direction after installation. The first four coils 19–22 can be powered, individually over separate leads 24–27, respectively. As can be seen from the connections drawn here, each coil output is connected in turn to the input of the respective fourth consecutive coil (19 is connected to 19', 20 to 21', etc.,) so that when power is supplied to one of the input leads 24–27, every fourth coil along the entire winding 2 will be energized.

The motor according to FIG. 1 operates as follows: when current is supplied to one of the input leads 24–27, the rotor adopts a position which is defined as a function of the magnetic field resulting from the coil energization pattern. As shown as current is supplied to the next input lead, the rotor rotatingly advances by one step. The rotor can be made to traverse wider angular paths by supplying power consecutively to the input leads in the following order: 24, 25, 26, 27, 24, 25. When the ring coil 10 is not energized, the bushing 9 will come to bear on the left hand bearing 4, at which time the rotor will be positioned at the lower end of the long leg 23 of the hexagonal coil windings (as viewed in FIG. 3). As soon as the ring coil is energized, the resulting magnetic field will act to draw the conical armature 16 into the hollow space 15 inside the flux conductor 13 until the projection 28 comes to bear on the right hand side bearing 5. A narrow air gap will then remain between the flux conductor 13 and the armature 16 which will allow the armature 16 and with it, the shaft 3, to move freely. As a result of the conical shape of the flux conductor and the armature, magnetic force can flow relatively smoothly from the annular coil 10 into the armature 16, thus bringing about a gentle shift of the rotor and shaft 3 in an axial direction with respect to the housing 1. In this extreme right hand position the rotor is located at the upper edge of the vertical branch of the coil windings (as viewed in FIG. 3). It will be seen from this description that the motor shaft will be capable of imparting stepped rotary motion to a driven component, as well as a stroke movement at right angles to this motion, purely as a function of the pattern of energization.

Figure 4:
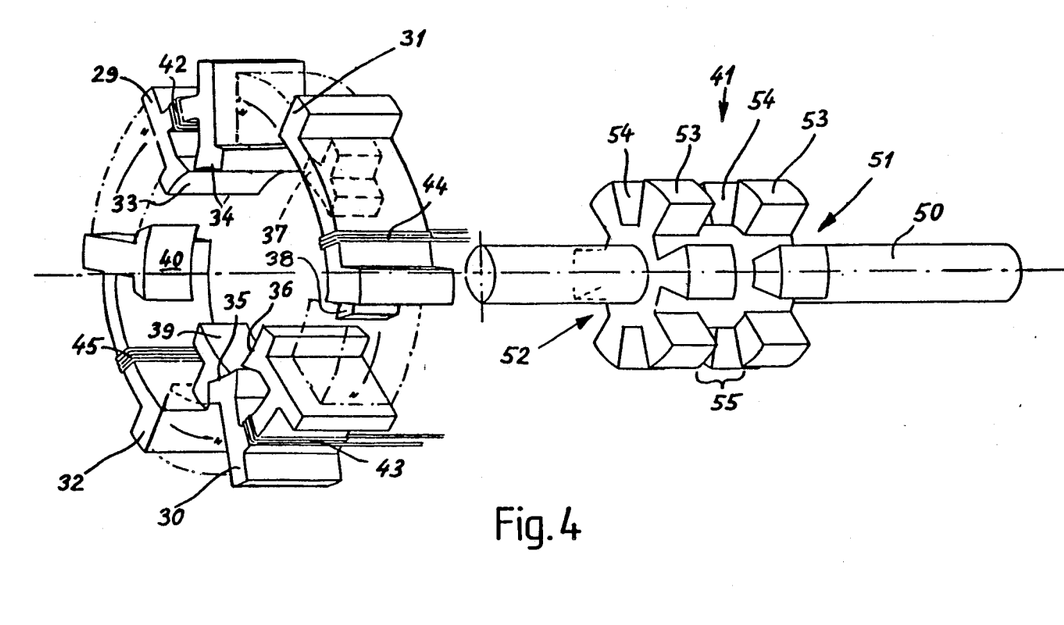
FIG. 4 is a perspective view of a further embodiment of the invention.
Figure 5:
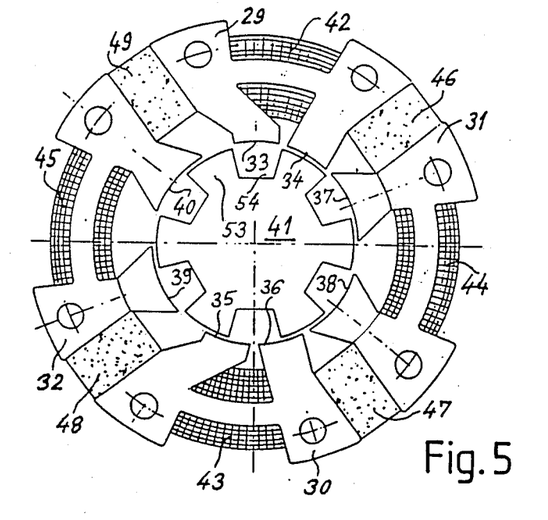
FIG. 5 shows a plan view of the embodiment shown in FIG. 4

In a further embodiment of the present invention according to FIGS. 4 and 5, the exciter system which imparts stepped rotary motion to the rotor, as well as the system which induces a relative shift in an axial direction, are both arranged in a common annular configuration. This annular configuration is provided with four yokes 29–32, each of which possesses two salient stator poles 33–40. Two yokes 29, 30 are provided to impart rotary movement to the rotor 41; the other two yokes 31, 32 cause the rotor 41 to shift in a axial direction. Each yoke 29–32 is provided with a coil 42–45, each of which can be individually and independently energized with reversible polarity. Permanent magnets 46–49 are also positioned between adjacent yokes 29–32 in the annular arrangement in such a way as to provide permanent magnet polarities of the same sign on both sides of one and the same yoke. In this way, for example, one side of yoke 29 is adjacent the north pole of permanent magnet 49 and its other side is adjacent the north pole of permanent magnet 46, whereas one side of yoke 31 will be adjacent the south pole of permanent magnet 46 and its other side will be adjacent the south pole of permanent magnet 47. This arrangement constitutes a so-called hybrid system in which the fields emanating from the permanent magnets 46–49 are influenced by the electromagnetic fields generated by the energized coils 42–45 so as to amplify, possibly even to double, the level of magnetic flux and thus the magnetic force in one pole of each yoke, whereas the magnetic flux will be damped, possibly even reduced to zero, in the other yoke pole. This arrangement makes it possible to magnetically energize one pole in each yoke by reversing the direction of current flow to the corresponding coil.

In this embodiment, the rotor 41 consists of two pole wheels 51, 52 arranged on the shaft 50 axially separated from one another, each of which is provided with six teeth 53 pitched in the same direction and whose face width at the perimeter of the pole wheels 51, 52 corresponds to the width of the slots 54. In this case, the axial width of each pole wheel should be equal to the axial width of the space 55 between each pole wheel.

The axial width of the poles 37–40 of the two yokes 31, 32 which impart axial movement to the rotor 41 will be essentially equal to the axial pitch of the teeth of one pole wheel, whereby the poles 37–40 will be positioned at equidistant axial intervals. In the embodiment shown in the drawing, the pole 37 is located at the lower end of the annular arrangement, pole 39 is shown at the next higher position, pole 38 at the next higher position to pole 39 and finally pole 40 is shown at the upper end of the annular arrangement.

The poles 33–36 of the yokes 29, 30 which impart rotary motion are of the same length in the axial direction, which length roughly corresponds to twice the axial dimension of a pole wheel tooth 53.

The width of poles 33–40 and their arrangement are such that poles 33–36 which effect rotary movement roughly correspond to the width of the teeth at the pole wheel perimeter, whereby the poles of one yoke 29, 30 are arranged immediately adjacent to one another, whereas the two yokes 29, 30 are offset by one half a tooth pitch with respect to pole wheels 51, 52. On the other hand, at their perimeter, the width of the poles 37–40 which impart axial motion is roughly equal to one and one half times that of a pole wheel tooth, whereby poles 37–40 are arranged so that at all positions of the rotor, a similar relation between the pole wheel tooth 53 and pole wheel gap 54 pertains opposite each of the poles 37–40. In the embodiments shown in FIGS. 4 and 5 the width of the teeth and the gaps in the rotor 41 all correspond to a 30° angle. The width of each of the poles 33, 34, 35 and 36 in yokes 29 and 30 which impart rotary motion approximately corresponds to 30°, whereby poles of each yoke are in immediate proximity to one another. The width of each of the poles 37, 38, 39 and 40 in yokes 31 and 32 which impart axial displacement approximately corresponds to 45°, whereby the poles of each yoke are located at a distance of about 15° from one another. Finally, the yokes 29, 30 which impart rotary motion, are arranged so that poles 34, 36 adjacent to one yoke 31, which imparts axial displacement, are positioned very closely adjacent poles 37, 38 of the yoke 31 which imparts axial displacement, with the result that poles 39, 40 of the second yoke 32 which imparts axial displacement and poles 33, 35 of yokes 29, 30 which impart rotary motion, are separated only by an interval of approximately 15°.

Figure 7:
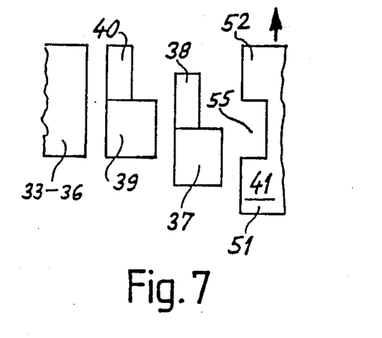
FIG. 7 is a diagram showing movement patterns

Furthermore, in the embodiment illustrated here, the axial width of the pole teeth 53 and the axial distance 55 between the pole wheel teeth are both 4 mm. It follows from this description that the axial width of poles 37–40 which impart axial displacement, will also be 4 mm, whereby pole 39 is axially offset 2 mm with respect to pole 37; pole 38 is axially offset 2 mm with respect to pole 39, and pole 40 is axially offset 2 mm with respect to pole 38. If coils 44 and 45 are suitably energized, the rotor 41, which is in its initial position, will be displaced; 2 mm in an axial direction as soon as 37. Pole becomes active. When pole 39 is next activated, the rotor will be displaced a further 2 in an axial direction. When pole 38 is then activated, the rotor will be displaced a further 2 mm in an axial direction, and as result of the subsequent activation of pole 40, the rotor arrives at the final limit of its travel in an axial direction, which represents an overall axial displacement of 8 mm with respect to its initial position. By exciting poles 37–40 in the reverse sequence, it is possible to reverse the direction of axial displacement of the rotor. This movement pattern is more clearly shown in FIG. 7 in which the same item references are used as in FIGS. 4 and 5.

Step-by-step rotation of the rotor 41 is effected in the usual way by alternate excitation of poles 33–36. It will be seen from this that the rotor 41 can be rotated step-by-step from any axial position to which the rotor may have been moved, as described above. The effect of the width and angular position of the poles 37–40 of yokes 31 and 32, which impart axial displacement, with respect to the pole wheel pitch is to reduce the effective resultant magnetic force components in poles 37–40 to zero, thus preventing the rotor from performing rotation under the effect of the current flow to the exciter system imparting axial movement.

A motor according to this embodiment allows an extremely compact design, of very low axial height, whereby the employment of the so-called hybrid pole system develops a high torque level. It is of course perfectly possible to envisage the production of a comparable design of motor with a different number of poles in particular if twice the number of poles are employed. In such instance, it is preferable for poles which are activated simultaneously to be positioned opposite one another so that the radial forces exerted on the shaft and bearings nullify one another.

Figure 6:
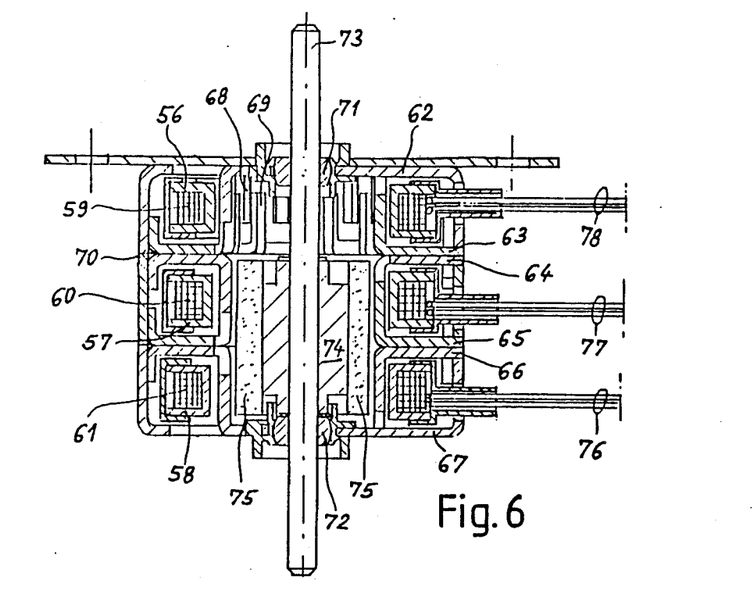
FIG. 6 shows a third embodiment of the invention.

FIG. 6 shows a further embodiment wherein three ring coils 59–61 are arranged above one another in an axial direction in coil carriers 56–58. Disk-shaped plates 62–67 of magnetically conductive sheet metal are arranged above and below each ring coil 59–61. Narrow ridges are stamped out of each disk and bent inwards so as to provide a series of poles 68, 69 along the inner face of each ring coil 59, 61. Each of the three ring coils possesses the same pole pitch and poles 68, 69 on the outer two ring coils 59, 61 are arranged in phase, whereas the poles on the central ring coil are out of phase. The motor housing 70 forms the magnetic return circuit.

A rotor 74, provided with permanent magnet teeth 75, is mounted on a shaft 73 which is supported in plain bearings 71, 72 so as to be able to move in an axial direction. The axial dimension of the rotor approximately corresponds to twice the height of one coil system. When the lower and central coils 61 and 60 are alternately energized over their current supply leads 76 and 77 respectively, the rotor adopts its lower final axial position and will be rotated step-by-step. When the upper and central coils 61 and 60 are alternately energized over their current supply leads 78 and 77 respectively, the rotor 74 moves to the lower limit of its travel in an axial direction and will be rotated step-by-step, as well. If, on the other hand, only one of the two outer ring coils 59, 61 is energized, the rotor will move to the corresponding extent of its travel in an axial direction, but will not rotate. It will be seen that this arrangement also provides two exciter systems, one of which (ring coils 59, 61) effects relative axial movement of the rotor 74 with respect to the stator, whereas the other exciter system (ring coil 60 alternately energized together with either ring coil 59 or 61), imparts rotary movement to the rotor. In addition, it may well be preferable in this latter design, as well as in the other two embodiments described here, to incorporate a return spring as well, so as to move the rotor to a defined initial axial position whenever the exciter system which imparts axial motion is not energized.

The permanent magnet teeth of the rotor 74 in FIG. 6 may be formed by so-called "radial magnetization" of the salients on the cylindrical outer surface of the rotor, and/or they may be rendered more marked and more effective by configuring slot-like recesses in an axial direction on the aforesaid outer surfaces on both sides of these teeth.

A fourth embodiment of the present invention is shown in FIGS. 8–14, where the exciter system which imparts step-by-step rotary movement to the rotor 80 is arranged in an annular configuration inside the rotor, whereas the exciter system which imparts movement in an axial direction is arranged in a similar configuration outside the aforesaid rotor. The rotor 80 may, for example, be pot-shaped. A shaft 83, which can be moved in an axial direction, is arranged at the center of the flat bottom 82 of the rotor. The cylindrical inner wall of the pot-shaped rotor 80 is provided with six salient poles 81 distributed radially and facing inwards, arranged at equidistant intervals about the perimeter. The aforesaid poles 81 are arranged parallel to the axis and their cross section is constant along their entire axial length. The cross section of the cylindrical outer wall of the rotor 80 corresponds to the basic shape of a toothed rack, whereby the individual teeth 84 are distributed in an annular configuration over the entire perimeter of the outer wall and, separated by the slots 85, are arranged essentially over the entire axial length of the rotor, parallel and at equidistant intervals to one another. For production reasons, the teeth 84 and the grooves have been given a trapezoidal contour.

Figure 8:
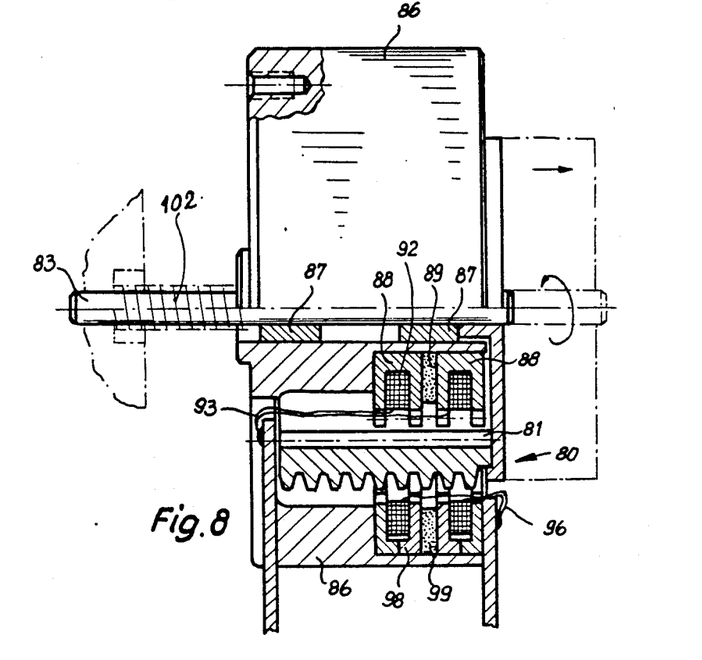
FIG. 8 shows a half sectional view of a fourth embodiment of the present invention
Figure 9:
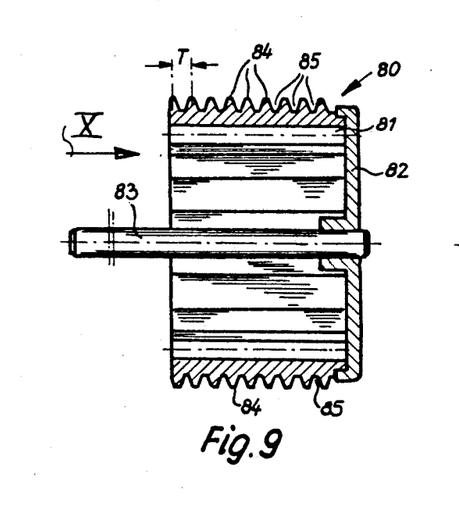
FIG. 9 shows a cross section of the rotor in the embodiment according to FIG. 8, along the line IX—IX in FIG. 10
Figure 10:
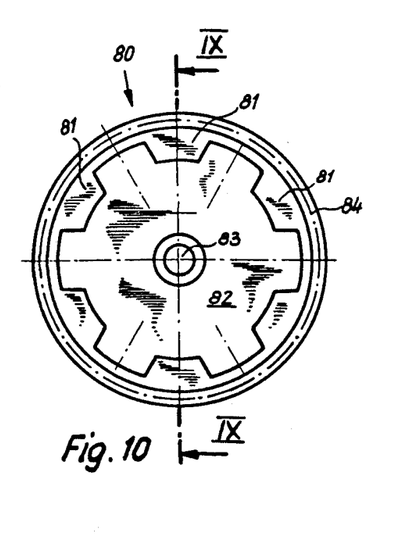
FIG. 10 shows a view of the rotor seen in the direction of the arrow X in FIG. 9
Figures 11, 12:
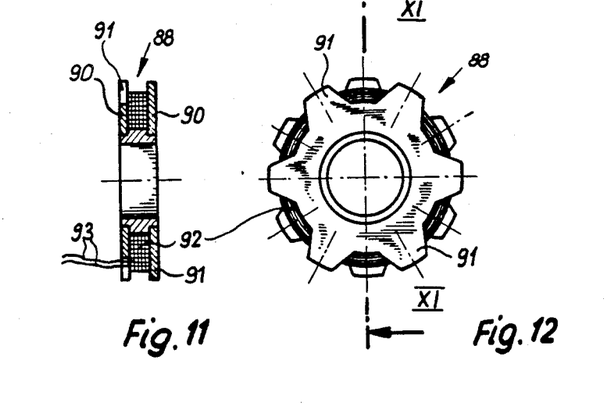
FIG. 11 shows a cross section of the stator element in the embodiment according to FIG. 8, along the line XI—Xl in FIG. 12
FIG. 12 shows plan view in an axial direction of the stator element shown in FIG. 11
Figure 13:
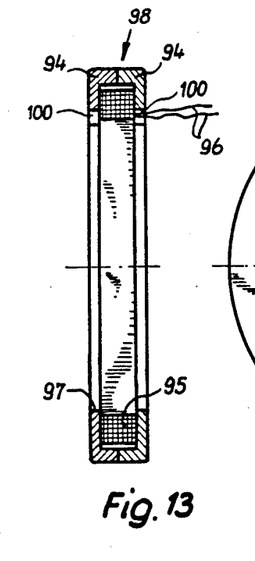
FIG. 13 shows a cross section of the stator ring in the embodiment according to FIG. 8, along the line XIII-—XIII in FIG. 14
Figure 14:
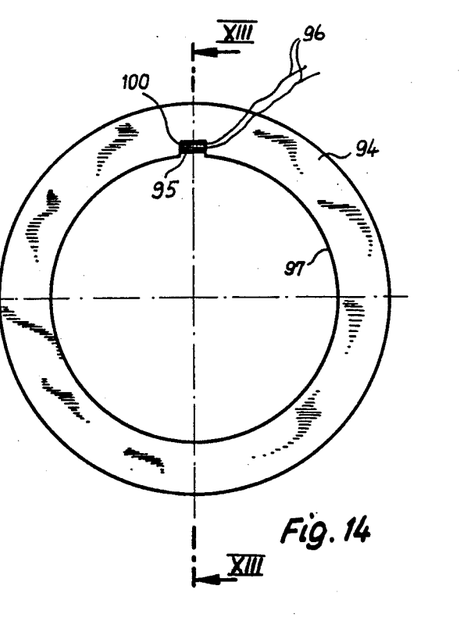
FIG. 14 shows a plan view in an axial direction of the stator ring shown in FIG. 13.

The exciter systems which impart movement to the rotor 80 are accommodated in a housing 86. The shaft 83 is supported by two bearings 87, which are fixed in the housing 86 and may, for example, be sintered bearings.

In this embodiment (FIG. 8), the exciter system which imparts rotary movement to the rotor 80, consists of an internal stator, comprising two stator elements 88, 88' and a magnetized permanent disk magnet 89 positioned axially between the aforesaid two elements. A pole disk 90 with six equidistant salient poles 91, is provided at each of the leading faces of the stator element 80, whereby the aforesaid salient poles face outwards in a radial direction and are located at a slight radial distance from the poles 81 of the rotor 80. The centers of the poles 91 of the two disk poles 90 of each stator element 88 are arranged so as to be offset at their perimeters by 30° with respect to one another. A ring coil together with its leads 93, is embedded between the disk poles.

The pole centers of the two identical stator elements 88 are arranged at an offset of 15° to one another at the perimeter. Only one pole pair 91 of the four axially offset disk poles 90 is arranged diametrically opposite the correspondingly diametrically arranged pole pair 81 extending over the entire length of the rotor.

The exciter system which imparts movement to the rotor 80 in an axial direction, contains an external stator. This stator consists of two stator rings 98 axially separated from one another by a permanent disk magnet 99 and fixed in the housing 86 concentric with the rotor 80. The stator rings 98 each consist of two pole disks 94, which are shaped like a flat pot and are connected to one another at the rim by suitable means. A ring coil 95 is arranged together with its leads 96 in the external diametric space between the pole disks 94. The continuous internal bore 97 in the pole disk 94 is provided with a recess 100 to accommodate the leads 96. The diameter of the internal bore 97 slightly exceeds the outside diameter of the teeth 84 on the outside wall of the rotor 80. The annular teeth 84, whose perimeter is continuous, serves, in conjunction with the circular inner rim (internal bore 97) to reinforce the pole disks 94. The axial distance between the centers of the pole disks 94 of each stator ring 98 is configured so that one of the pole disks 94 is positioned exactly opposite one tooth 84 of the rotor 80, while the other pole disk 94 lies opposite a slot. The axial distance between the two stator rings 98 is determined so that the center of the pole disk 94 of the second stator ring is always essentially centrally positioned between tooth 84 and slot 85 in the rotor 80. The thickness of the permanent magnet 99, is determinant in this respect. The preceding remarks relate to a fixed rotor.

One embodiment was configured so that the centers of the pole disks 94 of the stator ring 98 were far enough separated from one another in an axial direction, so that one pole disk 94 was positioned opposite a tooth 84 whereas the other pole disk 95 was opposite the slot 85, which follows the next tooth 84, i.e. in terms of the pole pitch T of teeth 84: at 1.5 times T. The distance between the two identical stator rings 98 was determined so that the outside pole disks 94 were separated from one another by a distance of 4.25 T and the inside pole disks were separated by a distance of 1.25 T (these distances are taken between the axial centers of the pole disks in each case).

With this arrangement, only one tooth 84 will be exactly opposite one pole disk 94 at all axial positions of the rotor.

When no current is being applied to the motor, the rotor 80 is maintained at its initial position by means of a return spring, FIG. 102.

Figure 15:
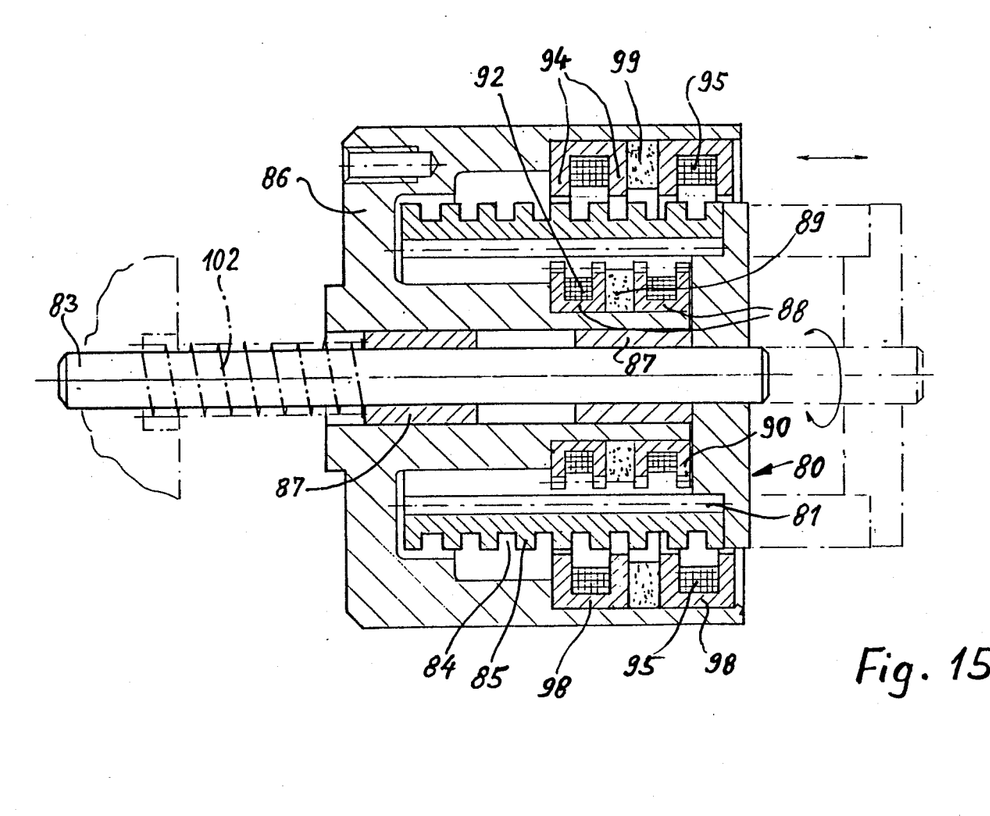
FIG. 15 shows a cross section of a fifth embodiment of the present invention, which is similar to that shown in FIG. 8, in which the elements employed match those shown in FIG. 9-11

Depending on the application concerned, step movement can be increased or decreased by modifying the tooth pitch, or alternatively, more or less steps can be obtained for a given tooth length. In this embodiment, two exciter systems of the same axial length were used, purely by chance. Depending on the production technology employed, the poles 91 may be given claw-shaped bent pole heads. FIG. 15 shows a variant of FIG. 8. The same item references are used in both drawings.

We claim:

1. An electric motor having a rotor with salient poles, a stator and an exciter system with a winding having coils which are selectively energized to impart step-by-step rotary motion to the rotor, the rotor and stator being supported to move in an axial direction with respect to one another, the exciter system including a first exciter imparting step-by-step rotary movement to the rotor, and a second exciter imparting relative axial movement within a zone to the rotor, both of these exciters being capable of being energized independently of one another, said first exciter having an air-core type multicoil winding generally formed in a cylindrical shape and encompassed within a ferromagnetic envelope, whose individual coils are adjacent one another in the direction of rotor rotation, each coil being generally hexagonal in shape with two of the parallel legs being longer than the other four, the two parallel long legs of the hexagonal extending generally parallel to the motor axis and generally coextensive with the zone of axial motor movement.

2. An electric motor according to claim 1, wherein the rotor is mounted on a shaft which is supported in a motor housing and is able also to move in an axial direction.

3. An electric motor according to claim 1 or 2, wherein the exciter system provided for step-by-step rotary movement and the exciter system provided for relative axial movement are arranged axially with respect to one another.

4. An electric motor according to claim 3, wherein a solenoid is axially spaced apart from the rotor to influence the rotor and when excited, causes the rotor to be displaced in an axial direction within given limits, and wherein the exciter which imparts rotary movement to the rotor is configured to impart the rotary movement to the rotor when the rotor is within the limits of its axial travel.

5. An electric motor according to claim 4, wherein a ring coil is provided to impart axial movement to the rotor, the ring coil being arranged about the shaft on which a ferromagnetic armature part is mounted, the ring coil and the armature part acting magnetically in conjunction with one another to effect the axial movement.

6. An electric motor according to claim 5, wherein the armature part is of conical shape and the interior of the ring coil is of hollow conical shape complementary to the armature part.

7. An electric motor according to claim 6, wherein the ring coil is cylindrically wound and is arranged on a ferromagnetic flux conductor of hollow conical shape.

8. An electric motor according to claim 1 or 2, wherein the rotor is provided with two pole wheels having teeth and identical slots arranged between circumferentially adjacent teeth and an axially magnetized annular permanent magnet axially separating the two pole wheels, the teeth of the pole wheels being offset by one half pitch with respect to one another.

9. An electric motor according to claim 1 wherein concentrated poles are provided at the perimeters of the pole wheels, the pole wheels being provided with similar slots.

10. An electric motor according to claim 8, wherein the distance between the coil windings in the exciter that imparts step-by-step rotary motion to the rotor is approximately equal to one half of the tooth pitch of the pole wheels.

11. An electric motor according to claim 1, wherein the exciter system which imparts step-by-step rotary movement as well as the exciter system which imparts relative axial movement, are both configured in a common annular-shape, the rotor comprising two identical slotted pole wheels spaced axially at a distance from one another and provided with teeth extending in the same direction, the exciter system for rotary movement being provided with salient poles whose axial dimension is such that when the rotor is located at the limit of its axial travel, at least one of the pole wheels is located within the full magnetic range of the salient poles and the exciter system which imparts relative axial movement to the rotor being provided with salient poles which are of the same dimension but are axially offset with respect to one another.

12. An electric motor according to claim 11, wherein the maximum extent of axial travel is divided into a plurality of individual strokes, at least one of the poles of the exciter system imparting relative axial movement being provided for each individual stroke and the length of each pole corresponding to the axial dimension of the pole wheel teeth, and the offset between the poles corresponding to the extent of the individual strokes.

13. An electric motor according to claim 11, wherein the width and the angular position of the poles with which rotary movement is imparted to the rotor are determined so as to provide rotary movement under alternate excitation of the poles, the width and angular position of the poles with which movement in an axial direction is imparted to the rotor are chosen so that any rotary position of the rotor, the resulting magnetic force components of one or more of the energized poles which impart axial movement to the rotor equal zero.

14. An electric motor according to claim 13, wherein the pole wheels of the rotor are provided with six poles and the stator is provided with eight poles, four of the stator poles being employed to impart rotary movement and the four other stator poles being employed to impart movement in an axial direction.

15. An electric motor according to claim 13, wherein the width of the poles which impart rotary movement approximately corresponds to the width at the perimeter of a pole wheel tooth.

16. An electric motor according to claim 14 or 15, wherein the width of the poles which impart movement in an axial direction approximately corresponds to one and one half times the width of a pole wheel tooth at its perimeter.

17. An electric motor according to claim 14 or 15, wherein the pole teeth and the pole wheel slots are of the same width.

18. An electric motor according to claim 17, wherein the poles which impart rotary movement and the poles which impart movement in an axial direction are alternately arranged adjacent to one another, the poles of each pole pair imparting rotary movement being approximately 30° in width and being arranged in close proximity to one another, and the poles of each pole pair imparting movement in an axial direction being approximately 45° in width and being arranged at intervals of about 15° from one another, whereby an interval of about 15° is provided between one of the pole pairs imparting axial movement and the pole pairs imparting rotary movement, the other pole pair imparting axial movement being arranged at only a very slight distance from the pole pairs imparting axial movement.

19. An electric motor according to claim 1 or 2, wherein at least the exciter system which imparts rotary movement of the rotor is with provided winding coils as well as permanent magnets which are arranged vertical in functional association with the stator poles so that the magnetic flux generated in these stator poles by the permanent magnets can be amplified or damped under the effects of the excitation of the coil windings.

20. An electric motor according to claim 17, wherein the poles in each pair are magnetically conductively connected to one another, a permanent magnet being arranged between each adjacent pole pair so that permanent magnet poles of the same sign are located on both sides of the same pole pair, each pole pair being provided with a coil winding.

21. An electric motor according to claim 1 or 2, wherein three similar annular exciter systems are arranged axially adjacent to one another, each of which is provided with a ring coil and salient poles, the two outside exciter systems being provided with in phase poles and central exciter systems being provided with out-of-phase poles, furthermore, a rotor which can be moved in an axial direction is provided with permanent magnet teeth whose axial height is such that the rotor lies within the effective magnetic range of the central exciter system and of one of the outer exciter systems at any of its extreme limits of travel in the axial direction, rotary movement of the rotor being brought about by means of alternate excitation of the central exciter system and one of the outer exciter systems, the rotor adopting an axial position which will depend on which of the outer exciter systems is energized at the time.

22. An electric motor according to claim 1 or 11, wherein a return spring is provided between the rotor and the motor housing by means of which the rotor can be moved to the limit of its travel in an axial direction.

23. An electric motor according claim 1, wherein the exciter system which imparts step-by-step movement is arranged coaxially inside the rotor and the exciter system which imparts relative movement in an axial direction is arranged coaxially outside the rotor.

24. An electric motor according to claim 2, wherein the exciter system which imparts step-by-step movement is arranged in an annular configuration in a housing between the shaft and the essentially cylindrical inner wall of the rotor, whereas the exciter system which imparts relative movement in an axial direction is arranged in an annular configuration outside the rotor.

25. An electric motor according to claim 23 or 24, wherein each of the exciter systems on the stator side includes a permanent magnet.

26. An electric motor according to claim 23 or 24, wherein the exciter system which imparts rotary movement includes two stator elements separated in an axial direction by an axially magnetized permanent disk magnet.

27. An electric motor according to claim 26, wherein the stator elements are provided with two upper pole disks on both sides, the pole centers being radially offset outwardly by 30° with respect to one another.

28. An electric motor according to claim 26, wherein the stator elements are rotated over angle of 15° with respect to one another.

29. An electric motor according to claim 23 or 24, wherein the exciter system which imparts relative movement in an axial direction includes two stator rings separated in an axial direction by an axially magnetized permanent disk magnet provided with two ring coils, each of which is in turn provided with two adjacent disk poles with a circular internal bore.

30. An electric motor having a rotor and stator wherein at least the stator possesses salient poles, the motor being provided with a first coaxial exciter system having a winding with selectively controlled coils allowing step-by-step rotor rotation, the air gap between the rotor and the stator being cylindrical, the rotor and the stator being mounted so that they can be displaced in an axial direction with respect to one another, a second coaxial exciter system being provided with at least one winding to cause relative axial movement, both exciter systems being controlled independently, the first exciter system having an air-core type multicoil winding formed in the shape of a cylinder and encompassed within a ferromagnetic envelope, whose individual coils are adjacent one another around the cylindrical form in the direction of rotor rotation, each coil being generally hexagonal in shape and having two parallel long legs extending generally parallel to the motor axis.

31. An electric motor according to claim 30, wherein the exciter system imparting step-by-step rotary movement and the exciter system imparting relative axial displacement are arranged adjacent one another in an axial direction, the rotor being provided with permanent magnets.

32. An electric motor according 30, wherein the exciter system imparting step-by-step rotary movement and the exciter system imparting relative axial displacement are arranged at least in approximately the same axially related positions, the stator being provided with permanent magnets.

33. An electric motor according to claim 32, wherein the permanent magnets operate in conjunction with both exciter systems.

34. An electric motor according to claim 32 or 33, wherein the exciter systems are located radially at a distance from one another and that they preferably form annular coil systems of different diameters inside and outside the rotor.

35. An electric motor according to claim 32 or 33, wherein the exciter systems form sectorial groups on an annular stator iron which are provided with coils arranged symmetrically with respect to one another.

36. An electric motor according to claim 30, wherein the rotor is fastened on a shaft which can be displaced in an axial direction inside the motor housing.

37. An electric motor according to claim 1, wherein the rotor is provided with at least two pole wheels which are flush with one another and are provided with similar slots.

38. An electric motor according to claim 21, wherein the rotor is provided with a return circuit arranged radially inwardly.

39. An electric motor according to claim 23, wherein internal wall of the hollow cylindrical rotor is provided with poles arranged at equal distances about its perimeter.

40. An electric motor according to claim 23, wherein the outer surface of the rotor forms equidistant peripheral slots, preferably of trapezoidal cross section, forming a toothlike configuration in an axial direction, the slot and tooth widths being the same and the dimension of the tooth pitch corresponding to T.

41. An electric motor according to claim 23, wherein the axial centers of the two pole disks of the stator ring are located at an axial distance of $(n+0.5) \times T$ from one another.

42. An electric motor according to either claim 40 or 41, wherein the axial distance between the axial centers of the two inboard pole disks of the identical stator rings corresponds to $(n+0.25) \times T$.

* * * * *